United States Patent Office 2,983,721
Patented May 9, 1961

2,983,721

OXAZIRANE CATALYTIC POLYMERIZATION OF OLEFINIC HYDROCARBONS

Edmund B. Towne and James E. Guillet, Kingsport, Tenn., assignors to Eastman Kodak Company, Rochester, N.Y., a corporation of New Jersey No Drawing. Filed Apr. 17, 1959, Ser. No. 807,013

6 Claims. (Cl. 260—94.9)

This invention relates to the catalytic polymerization of normally gaseous α-monoolefins to high molecular weight solid polyethylene. In a particular aspect this invention is concerned with the polymerization of ethylene to form solid, high molecular weight polyethylene.

Solid polyethylene has been produced by high pressure procedures wherein ethylene is polymerized to a solid waxy polymer using pressures in excess of 500 atmospheres and usually of the order of 1000–2000 atmospheres. This high pressure polyethylene has been characterized by a high degree of flexibility, good film forming properties and a waxy feel. It is also possible to polymerize other olefinic hydrocarbons, such as propylene and its higher homologs, to solid polymers using high pressure procedures.

In the past a variety of catalysts have been suggested for use in these high pressure polymerization procedures. Among the catalysts that have been suggested are a variety of peroxides and hydroperoxides as well as certain azo compounds and hyponitrites. In conducting polymerization reactions of this type, it is desirable to have a simple and inexpensive catalyst system whereby ethylene and similar gaseous α-monoolefins can be converted to high molecular weight solid polymer at relatively high pressures.

It is accordingly an object of this invention to provide a new and improved process for effecting conversion of normally gaseous α-monoolefins, to high molecular weight, solid polymers. Another object of the invention is to provide a new and improved process for catalytic polymerization of ethylene to solid polymers employing a rather simple and readily prepared catalyst. Another object of the invention is to facilitate the commercial manufacture of ethylene polymers by providing an economical process which can be readily carried out at pressures above 8,000 p.s.i. and at temperatures ranging from 25° C. to 300° C. Other objects will be apparent from the description and claims which follow.

These and other objects are attained by means of this invention wherein it was found unexpectedly that the normally gaseous α-monoolefins, particularly ethylene could be converted to high molecular weight, solid polymers by effecting the polymerization in the presence of certain oxaziranes as catalysts for the polymerization reaction. It has now been found that these catalysts can be used quite effectively to produce solid polymers at high polymerization rates since the catalysts decompose readily at low temperatures. Furthermore, the catalysts can be readily prepared and are simple to handle in large scale manufacturing operations. The reason why these catalysts actually exhibit catalytic activity is not readily understood and could not be predicted from the art wherein it is apparent that the catalytic activity is empirical and unpredictable. An especially advantageous feature of this catalyst composition is that by procedural variations in introducing the catalyst to the polymerization reaction it is possible to control the rate of reaction and the type of polymer formed in the reaction.

The catalysts that are used in our polymerization process are oxazirane compounds having the structural formula:

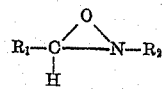

wherein $R_1$ can be hydrogen, an alkyl, or an aryl radical, and $R_2$ can be an alkyl or an aryl radical. Among the alkyl and aryl radicals represented by $R_1$ and $R_2$ are alkyl radicals containing 1 to 8 carbon atoms, such as methyl, ethyl, propyl, isopropyl, butyl, tertiary butyl, pentyl, isopentyl, hexyl, heptyl, octyl, and the like and aryl radicals, such as phenyl, naphthyl, nitrophenyl, tolyl, xylyl, and the like. The oxaziranes consist basically of an oxygen, nitrogen and carbon three-membered ring and they can be prepared by reacting an aldehyde with an amine to form the aldimine followed by oxidation to the oxazirane using an oxidizing agent such as peracetic acid. The catalytic activity of the oxaziranes depend upon the structure of $R_1$ and $R_2$. Generally, those oxaziranes wherein one or both of $R_1$ and $R_2$ are aryl radicals are quite stable and decompose at relatively high temperatures. The preferred oxaziranes for our process are those wherein $R_1$ is either hydrogen or an alkyl radical, and $R_2$ is an alkyl radical.

The inventive process is carried out preferably in the absence of an inert organic liquid, but if desired the reaction can be conducted in the presence of up to 20% by weight of a hydrocarbon, such as propane, hexane, benzene, and the like. The process can be operated over a relatively wide temperature range with temperatures of 25° C. to 300° C. being preferably employed, and particularly good results being obtained in the range of 50° C. to 250° C. The pressure can be varied as desired, with pressures as low as 8,000 p.s.i. being operable. Generally speaking, however, it is desirable to employ a pressure in the range of 10,000–50,000 p.s.i.g. with pressures from 10,000 to 20,000 p.s.i.g. being preferred for optimum yields.

The invention can be used for polymerizing any of the well known α-monoolefinic hydrocarbons and preferably those containing from 2 to 10 carbon atoms, and the invention is particularly applicable for polymerizing ethylene. When ethylene is employed as the monomer, the polyethylene obtained has a softening point or fusion point greater than 100° C. The polymers embodying this invention have molecular weights greater than 1000 and usually greater than 10,000. The achievement of extremely high molecular weights does not present a problem employing the catalytic process herein described, and molecular weights even greater than 1,000,000 can be readily attained. The high molecular weight polyethylenes of this invention are insoluble in solvents at ordinary temperatures, but they are soluble in such solvents as xylene, toluene or tetralin at temperatures above 100° C. With the exception of the compounds of extremely high molecular weight, the polyethylenes obtained according to this invention are soluble in tetralin at 145° C. These solubility characteristics make it possible to carry out the polymerization process under conditions wherein a polymer formed is soluble in the reaction medium during the polymerization and can be precipitated therefrom by lowering the temperature of the resulting mixture by stripping off the residual gaseous ethylene.

The polyethylenes of this invention are crystalline and usually exhibit crystallinity above 60% as shown by X-ray diagrams. Ordinarily, the crystallinities of the polyethylenes obtained by this process average close to 70%. The number of methyl groups per hundred carbon atoms in the polyethylenes of this invention are of the order of 3.0 or lower. The densities are of the order of 0.920 or higher, with densities of the order of 0.95 or higher being obtained in many cases. The inherent viscosities as measured in tetralin at 145° C. may be varied from about 0.5 or lower to 5.0 or higher. Melt indices as measured by the standard ASTM method may be varied from about 0.01 to 100 or even higher.

The polyethylene prepared in accordance with the invention can be molded or extruded into flexible plates or films. The products can be extruded into the form of pipe or tubing or can be injection molded into a great variety of articles. The polymers can also be cold drawn into ribbons, bands, fibers or filaments of high elasticity and rigidity. Fibers of high strength can be spun from the molten polyethylene obtained according to this process. The process of the invention can also be employed to effect the copolymerization of ethylene with other polymerizable α-monoolefins and particularly with propylene. Other monoolefins which are suitably employed in admixtures with ethylene include such materials as n-butylene, isobutylene, 1-pentene, 1-decene, and similar α-monoolefins. In some cases, it is desirable to prepare such copolymers in order to modify the properties for particular uses such as in molding or extrusion applications. Thus, copolymers of 85–95% ethylene with 15–5% propylene are desirably prepared in many cases.

The polymerization embodying the invention can be carried out batchwise or in a continuous flowing stream process. The continuous processes are preferred for economic reasons, and particularly good results are obtained using a continuous process wherein a polymerization mixture of constant composition is continuously and progressively introduced into the polymerization zone, and the mixture resulting from the polymerization is continuously and progressively withdrawn from the polymerization zone in amounts correlated and equivalent to the rate of introduction, whereby polymers of extremely uniform molecular weight distribution over a relatively narrow range are obtained. Such uniform polymers possess distinct advantages since they do not contain the low molecular weight or high molecular weight fractions which are ordinarily found in polyolefins prepared by batch processes. The ethylene or other α-monoolefin can be charged to the polymerization mixture either as a pure material or in admixture with other materials such as hydrogen and hydrocarbons such as methane, ethane or propane. Ordinarily, relatively pure monomers are employed unless copolymers are desired. When the charged mixture consists of two or more olefins, the product consists of a true copolymer of the monomers rather than a mixture of homopolymers.

Although temperaures ranging from 25° C. to 300° C. can be employed as desired, the usual process adapted for commercial production is carried out a a temperature in the range of from 50° C. to 250° C. for best results. In the preparation of the uniform polymers by the continuous flowing stream process, the temperature is desirably maintained at a substantially constant value within the preferred range in order to achieve the highest degree of uniformity. Since it is desirable to employ relatively high concentrations of monomer, the process is desirably effected under a pressure of from 10,000 to 50,000 p.s.i. obtained by pressuring the system with the monomer being polymerized. Best results are obtained using a concentration of catalyst of from about 10 p.p.m. to about 1% and desirably 10 to 200 p.p.m. by weight based on the monomer. The polymerization time can be varied as desired from a period of a few minutes or hours to several days. When a continuous process is employed, the contact time in the polymerization zone can also be regulated as desired and in some cases it is not necessary to employ reaction or contact times much beyond 5 to 10 minutes since a cyclic system can be employed involving removal of the polymer and return of the vehicle and unused catalyst to the charging zone wherein the catalyst can be replenished and additional monomer introduced.

Any organic diluent that is employed can be an aliphatic alkane or cycloalkane such as pentane, hexane, heptane or cyclohexane, or a hydrogenated aromatic compound such as tetrahydronapthalene or decahydronaphthalene, or a high molecular weight liquid paraffin or mixture of paraffins which are liquid at the reaction temperature, or an aromatic hydrocarbon such as benzene, toluene, xylene, or the like, or a halogenated aromatic compound such as chlorobenzene, chloronapthalene, or orthodichlorobenzene. The nature of the diluent is subject to considerable variation, although the diluent employed should be liquid under the conditions of reaction and relatively inert. The hydrocarbon liquids are desirably employed. Other diluents which can be used include ethyl benzene, isopropyl benzene, ethyl toluene, n-propyl benzene, diethyl benzenes, mono and dialkyl naphthalenes, n-octane, isooctane, methyl cyclohexane, tetralin, decalin, and any of the other well-known inert liquid hydrocarbons.

The polymers obtained in accordance with this invention can be extruded, mechanically milled, cast or molded as desired. The polymers are sometimes particularly valuable as blending agents with the relatively more flexible high pressure polyethylenes to give any desired combination of properties. The polymers can also be blended with antioxidants, stabilizers, plasticizers, fillers, pigments and the like or mixed with other polymeric materials, waxes and the like. In general, aside from the relatively higher values for properties such as softening point, density, stiffness and the like, the polymers embodying this invention can be treated in similar manner to those obtained by other processes.

The following examples are illustrative of our invention.

*Example 1*

8 mg. of N-tert-butyl oxazirane dissolved in 1.0 ml. toluene was placed in a 100-cc. autoclave. The autoclave was purged with ethylene, pressured to 8,000 p.s.i. with ethylene and raised to 140° C. The pressure was adjusted to 20,000 p.s.i. and the reaction maintained at that pressure and temperature with stirring for 2 hours. On cooling and venting the autoclave, 2.25 g. of polymer was obtained. This polymer had a density of 0.928 and an inherent viscosity in tetralin at 100° C. of 1.85.

*Example 2*

The procedure of Example 1 was repeated except that the temperature was maintained at 202° C. The yield of polymer was 6.35 g. The polymer had an inherent viscosity of 1.56 and a density of 0.925.

*Example 3*

20 mg. of N-tert-butyl oxazirane was charged to the autoclave in solution in 1 cc. benzene. The autoclave was flushed with hydrogen, pressured to 200 p.s.i. with hydrogen, then to 8,000 p.s.i. with ethylene. The temperature was raised to 100° C. and the pressure to 20,000 p.s.i. by addition of more ethylene. These conditions were maintained for 2 hours with rapid stirring. After cooling and venting, 5.7 g. of polymer was obtained having a density of 0.946 and an inherent viscosity of 1.6.

*Example 4*

20 mg. of p-nitrophenyl N-ethyl oxazirane was charged to an autoclave. The autoclave was pressured with ethylene and raised to 160° C. with stirring for 6 hours. 5.4 grams of polymer was obtained having a density of 0.922 and a viscosity of 1.2.

*Example 5*

10 mg. of N-ethyl t-butyl oxazirane was used as the catalyst using the procedure of Example 1. 4.2 grams of polymer was obtained having a density of 0.931 and a viscosity of 1.2.

The invention has been described in detail with particular reference to preferred embodiments thereof, but it will be understood that variations and modifications can be effected within the spirit and scope of the invention as described hereinabove and as defined in the appended claims.

We claim:

1. In the polymerization of at least one normally gaseous α-monoolefin to form solid polymer, the improvement which comprises effecting the polymerization in the presence of an oxazirane compound having the structural formula:

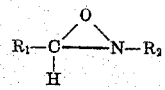

wherein $R_1$ is selected from the group consisting of hydrogen, alkyl, and aryl and $R_2$ is selected from the group consisting of alkyl and aryl as a catalyst for the reaction at a temperature of 25° C. to 300° C. and a pressure of 8,000 to 50,000 p.s.i.

2. In the polymerization of ethylene to form solid polymer, the improvement which comprises effecting the polymerization in the presence of an oxazirane compound having the structural formula:

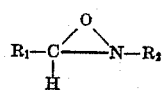

wherein $R_1$ is selected from the group consisting of hydrogen and alkyl radicals containing 1 to 8 carbon atoms and $R_2$ is an alkyl radical containing 1 to 8 carbon atoms at a temperature of 25° C. to 300° C. and a pressure of 8,000 to 50,000 p.s.i.

3. In the polymerization of ethylene to form solid polymer, the improvement which comprises effecting the polymerization at a temperature of 25° C. to 300° C. and a pressure of 8,000 to 50,000 p.s.i. and in the presence of N-tert-butyl oxazirane as a catalyst for the reaction.

4. The process according to claim 3 wherein the catalyst is employed in a concentration of 10 p.p.m. to 1% by weight based on the ethylene.

5. In the polymerization of ethylene to form solid polymer, the improvement which comprises effecting the polymerization at a temperature of 50° C. to 250° C., a pressure of 8,000 to 50,000 p.s.i. and in the presence of N-ethyl t-butyl oxazirane as a catalyst for the reaction.

6. In the polymerization of ethylene to form solid polymer, the improvement which comprises effecting the polymerization at a temperature of 50° C. to 250° C., a pressure of 8,000 to 50,000 p.s.i. and in the presence of p-nitrophenyl N-ethyl oxazirane as a catalyst for the reaction.

References Cited in the file of this patent

UNITED STATES PATENTS

| | | |
|---|---|---|
| 2,462,678 | Roedel | Feb. 22, 1949 |
| 2,784,182 | Krimm et al. | Mar. 5, 1957 |